Figures 2, 3:
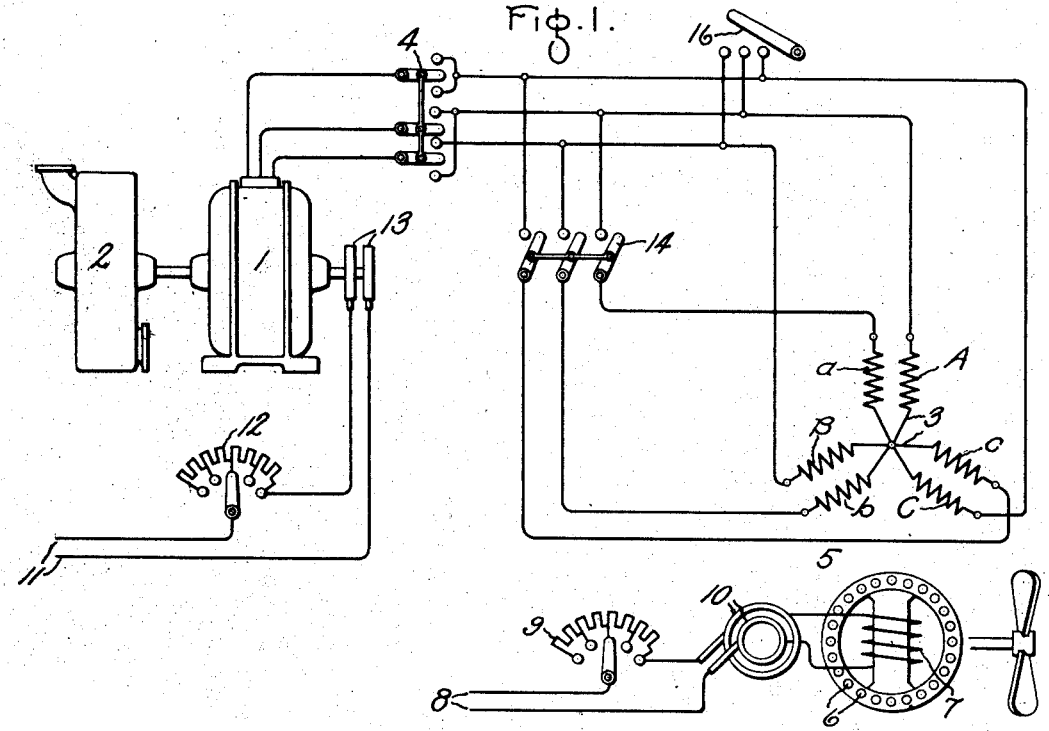

Aug. 25, 1925. 1,551,529

C. MACMILLAN

DYNAMIC BRAKING OF SHIP PROPULSION MOTORS

Filed July 26, 1923

24 pole normal
A b C ā B c̄ A b C ā B c̄
B̄ c Ā b C̄ a B̄ c Ā b C̄ a

With alternate  A — C — B — A — C — B —
open sections   B̄ — Ā — C̄ — B̄ — Ā — C̄ —

Equivalent to .866 × 2(A — C — B — A — C — B)

Equivalent to .866 × A B̄ C Ā B C̄ A B̄ C Ā B C̄ — 24 pole ←

A B C A B C A B C A B C — 48 pole →

S N S N S N S N S N ←
 S   N   S   N   S   N →
2S  2N  2S  2N  2S  2N

Inventor:
Campbell Macmillan,
by  Alexander S. ____
His Attorney.

Patented Aug. 25, 1925.

1,551,529

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

DYNAMIC BRAKING OF SHIP-PROPULSION MOTORS.

Application filed July 26, 1923. Serial No. 654,009.

*To all whom it may concern:*

Be it known that I, CAMPBELL MACMILLAN, a citizen of the United States, residing at Schenectady, in the county of Schenectady and State of New York, have invented certain new and useful Improvements in Dynamic Braking of Ship-Propulsion Motors, of which the following is a specification.

My invention relates to ship propulsion and has for its object the provision of a system of electric ship propulsion wherein a propeller motor adapted to be supplied with current from an alternating current generator is arranged to have its connections modified for the purpose of bringing the propeller to standstill by dynamic braking or by combined dynamic braking and motor torque as may be desired.

The speed-torque curve of the propeller during reversal from full speed ahead of the ship differs greatly from that of an induction motor with normal rotor resistance or with one step of additional resistance, the chief discrepancy occurring at about 135% slip of the propeller motor at which speed the motor may be required to exert its full speed running torque. Aside from the torque rise in the neighborhood of 135% slip, the torque produced as a result of the propeller being dragged through the water by the momentum of the ship may be counteracted by an induction motor with moderate starting torque. At this critical stage of the operation, therefore, it is desirable to arrange the electrical equipment for producing the maximum torque of which it is capable. When synchronous motors or motors which may be operated as synchronous or induction motors are used, it is possible to provide a braking rheostat arranged to be connected to the stator winding of the motor while bringing the propeller to standstill against the torque imparted to it by the momentum of the ship. In order to avoid the complications incident to the use of such a rheostat, I propose to arrange the motor for internal cascade operation, its stator or inducing winding being arranged as an internal cascade connection through which is produced a magnetic field rotating in a direction opposite to that in which a squirrel cage winding on the rotor member is driven by the propeller as it comes to rest.

My invention will be better understood on reference to the following description taken in connection with the accompanying drawing, and its scope will be pointed out in the accompanying claims.

Referring now to the drawing: Fig. 1 shows a system of ship propulsion in which my invention has been embodied; and Figs. 2 and 3 indicate the current distribution corresponding to different connections of the motor winding.

Fig. 1 shows an alternating current generator 1 driven by a prime mover 2 and arranged to supply current to the stator or inducing winding 3 of a propeller motor 5, the secondary member of which is provided with an induced winding shown as a high resistance squirrel cage winding 6 and an exciting winding 7 adapted to be supplied with current from any suitable source through rheostat 9 and slip rings 10. The field winding of the alternator 1 is supplied with exciting current from a suitable source 11 through field rheostat 12 and slip rings 13. The alternator 1 and the motor 5 are arranged to be interconnected through a reversing and disconnecting switch 4. A switch 14 is provided for connecting the coils $a$, $b$ and $c$ of the winding 3 to the alternator 1 and a short circuiting switch 16 is provided for interconnecting the terminals of the coils A, B and C of the winding 3. For purposes of illustration it has been assumed that the winding 3 is adapted to produce 24 poles but my invention obviously is not limited to any particular number of poles.

During normal ahead operation of the ship the alternator and motor fields are excited, switches 4 and 14 are closed, and switch 16 is open. Under these conditions all the coils are energized as indicated by the first group of letters in Fig. 2, and the motor is driven at a speed determined by its primary pole number and the system frequency.

In bringing the propeller to rest by means of dynamic braking alone, steam is shut off, the generator and motor field circuits are opened or the field currents are reduced to a low value by means of the rheostats 9 and 12, switches 4 and 14 are opened, switch 16 is closed and the rheostat 9 is manipulated to increase the field current of the motor 5 to a high value. The operation of the motor under these conditions may be understood by considering the action of the coils a, b, c and A, B, C of the winding 3. As indicated by Fig. 3, the resultant magnetic field produced by the combination of two rotating fields of equal intensity having opposite phase sequence and pole numbers in the ratio of two to one is equivalent to a single rotating field of double intensity with its alternate sections idle. Take for example the 60 cycle, 24 pole motor 5 (see Fig. 1) running normally at 300 revolutions per minute and having 6-phase distribution and coils of 2/3 pitch. If in each phase alternate poles are controlled by separate switches then by opening switch 14 and closing switch 16 the connections of the motor winding may be modified to produce the two rotating fields represented by the first two lines in Fig. 3 when the motor is driven by the propeller as a generator and its 24 pole exciting winding 7 is supplied with current from the source 8. That this is true will become clearer upon consideration of Fig. 2 in which legends are affixed to the various groups of letters for the purpose of indicating the conditions which result from the different connections.

The group of letters bearing the legend "24 pole normal" indicates the current distribution when the winding 3 is connected to the generator 1 through switch 4, the switch 14 being closed and the switch 16 being open. Under these conditions all the stator coils are excited and the motor 5 operates as a normal 24 pole machine. The group of letters bearing the legend "With alternate open sections" indicate the current distribution when the coils a, b and c in the various phases of the winding 3 are disconnected by the opening of the switch 14. Under these conditions only the coils A, B and C carry current and a 24 pole field, rotating in a counter-clockwise direction for example, is produced. The current distribution under these conditions also may be represented as indicated by the group of letters bearing the suffix "Equivalent to .866x2," a uniform angular phase displacement of 30 electrical degrees being assumed and the factor .866 being introduced because of the fact that the winding is 2/3 instead of full pitch, which means that conductors in the same slot carry currents which are not in phase. This current distribution, as has been previously indicated and as shown by the last group of letters, is adapted to produce a 24 pole field and a 48 pole field rotating in opposite directions. The 48 pole distribution appears simply as additional reactance if no short circuited secondary is provided for it. However, if the rotor has a squirrel cage winding or solid pole faces, the 48 pole field exerts a torque which tends to drive the motor in a direction opposite that of its rotation. The stator winding 3 thus acts as a cascade connection between the windings 7 and 6. Assuming the 24 pole field 7 of the motor 5 to be driven by the propeller at 300 revolutions per minute, the switch 14 being open and the switch 16 being closed, the 48 pole field produced by coils A, B and C rotate at 150 revolutions per minute, and cuts the squirrel cage bars at 450 revolutions per minute, thereby producing a very effective dynamic braking action by which the propeller may be brought to rest.

In bringing the propeller to rest by combined dynamic braking and motor torque the connections between the generator 1 and the motor 5 are reversed by means of switch 4, and the switch 16 is not closed. The procedure is otherwise the same as in the case of pure dynamic braking and the operation differs in that the stator current of the motor 5 is conducted to the armature winding of the generator 1 and the motor 5 which is now driven as a generator and tends to drive the generator 1 as an induction motor in a direction opposite to that in which it is driven by the inertia of its rotating parts, the energy supplied from the motor 5 being dissipated in the amortisseur windings and solid pole pieces of the generator. Under these conditions the generator is also delivering energy to the distorted motor which develops 24 pole torque in the normal direction corresponding to the position of the reversing switch, and also a 48 pole torque in the opposite direction.

When the ship has been brought substantially to rest by dynamic braking, or by combined dynamic braking and motor torque, it may be accelerated in the opposite direction according to several different modes of operation. For example, where the ship has been brought substantially to rest by dynamic braking, the excitation may be removed from the motor, the switch 16 opened and the switch 4 closed for the desired direction of operation. The acceleration may be effected to a desired value with switch 14 open, after which the switch 14 may be closed and the acceleration continued, the motor operating as an ordinary induction motor, and when substantial synchronism has been reached, the field excitation may be applied to the motor to bring the motor into step. It is also apparent that if desired the switch 14 may be closed so that the motor operates throughout acceleration as a normal induction motor, the field excitation being applied at any desired point near synchronism.

Where the ship has been brought substantially to rest by combined dynamic braking and motor torque, acceleration may be effected if desired by removing the excitation from the motor. The switch 14 may be closed and the excitation applied to the motor to bring the motor into step as heretofore indicated.

Where the direction of propeller rotation is reversed while the ship is still moving at a substantial rate of speed, it is necessary not only that the propeller be brought to rest but also that it be held against the torque exerted on it as it is dragged through the water by the momentum of the ship. Under these conditions the mode of reversal differs somewhat from that previously described. In the case of combined dynamic and motor torque braking, the field circuit of the motor may be maintained throughout the operation and acceleration of the propeller in the reverse direction may be effected by merely closing the switch 14, the motor being accelerated and synchronized without essential manipulation of any other switching means. Likewise in the case of pure dynamic braking the field of the motor may be maintained while the switches 4 and 14 are closed for reverse operation, the switch 16 being opened and the motor thereafter being brought up to speed with or without deenergization of its field.

While I have indicated several modes of operation for accelerating the motor after the propeller has been brought substantially to rest, it is apparent that my invention in its broader aspects is not limited to any one of these specified modes of operation.

By providing the proper resistance in the squirrel cage winding 6, the maximum braking torque may be obtained at any desired speed and the speed torque curve of the motor may thus in a measure be made to follow the speed-torque curve of the propeller. If the energy is discharged into solid pole faces there is no definite maximum but the torque continues to rise with increasing frequency. By imbedding low resistance bars in the iron at a suitable depth a double squirrel cage characteristic may be produced. This will give a torque peak near synchronism which may be utilized to assist in synchronizing the motor when changing from induction to synchronous motor operation.

In accordance with the provisions of the patent statutes, I have described the principle of my invention together with the apparatus which I now consider to represent the best embodiment thereof, but I desire to have it understood that the apparatus shown is only illustrative, and that the invention may be carried out by other means.

What I claim as new and desire to secure by Letters Patent of the United States, is:—

1. A system of electric ship propulsion wherein a propeller motor provided with direct current and induced windings is arranged to have its connections altered for producing a torque opposed to that exerted by the propeller as it is dragged through the water by the momentum of the ship, characterized by the fact that the inducing winding of said motor is arranged to operate as a cascade connection between said direct current and induced windings whereby said propeller may be brought to rest by dynamic braking.

2. A system of electric ship propulsion wherein a multipolar polyphase propeller motor adapted to be supplied with current from an alternating current generator is arranged to have its connections altered for producing a torque opposed to that exerted by the propeller as it is dragged through the water by the momentum of the ship, comprising means for open circuiting alternate poles in each phase of the inducing winding of said motor, and means for short circuiting the remaining coils in each phase of said inducing winding.

3. A system of electric ship propulsion wherein a multipolar polyphase propeller motor adapted to be supplied with current from an alternating current generator is arranged to have its connections altered for producing a torque opposed to that exerted by the propeller as it is dragged through the water by the momentum of the ship, comprising means for open circuiting alternative poles in each phase of the inducing winding of said motor, and means for reversing the connections between said motor and said generator whereby said propeller may be brought to rest by combined dynamic braking and motor torque.

4. A system of electric ship propulsion wherein a multipolar polyphase propeller motor adapted to be supplied with current from an alternating current generator is arranged to have its connections altered for producing a torque opposed to that exerted by the propeller as it is dragged through the water by the momentum of the ship, comprising means for open circuiting alternate poles in each phase of the inducing winding of said motor, means for short circuiting the remaining poles in each phase of said inducing winding, and a squirrel cage winding supported by the field structure of said motor whereby the propeller may be brought to rest by dynamic braking.

5. In a system of electric ship propulsion comprising a propeller motor adapted to operate with N-poles, the method of braking said motor to produce a torque for bringing said propeller to standstill against the torque exerted upon it as it is dragged through the water by the momentum of the ship which consists in arranging the armature winding of said motor to produce N-pole and 2 N-pole magnetic fields rotating in opposite directions, and in exciting the field winding of said motor.

6. The method of operating a system of electric ship propulsion, comprising an alternating current generator and a propeller motor constructed to operate either with synchronous or induction motor characteristics and adapted to operate with N-poles, to produce a torque for bringing said propeller to standstill against the torque exerted upon it as it is dragged through the water by the momentum of the ship which consists in arranging the armature winding of said motor to produce N-pole and 2 N-pole magnetic fields rotating in opposite directions, connecting said generator to said motor with reversed phase rotation, and exciting the field of said motor.

7. The method of operating a system of electric ship propulsion, comprising an alternating current generator and a propeller motor constructed to operate either with synchronous or induction motor characteristics and adapted to operate with N-poles, to produce a torque for reversing the propeller against the force exerted upon it as it is dragged through the water by the momentum of the ship which consists in arranging the armature winding of said motor to produce N-pole and 2 N-pole magnetic fields rotating in opposite directions, connecting said generator to said motor with reversed phase rotation, exciting the field of said motor and increasing the excitation of said generator to bring said motor up to speed in the reverse direction.

In witness whereof, I have hereunto set my hand this 25th day of July, 1923.

CAMPBELL MACMILLAN.